(12) United States Patent
Fett

(10) Patent No.: US 6,689,009 B1
(45) Date of Patent: *Feb. 10, 2004

(54) COMPACT DIFFERENTIAL ASSEMBLY

(75) Inventor: Gregory Allen Fett, Ft. Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/893,575

(22) Filed: Jun. 29, 2001

(51) Int. Cl.[7] ............................................. F16H 48/08
(52) U.S. Cl. ........................... 475/230; 74/424; 74/607
(58) Field of Search .................... 475/230; 74/424, 74/607

(56) References Cited

U.S. PATENT DOCUMENTS

| | | |
|---|---|---|
| 1,316,248 A | 9/1919 | Latham |
| 1,421,834 A | 7/1922 | Ross |
| 1,810,194 A | 6/1931 | Weaver |
| 1,886,668 A | 11/1932 | Gabli |
| 1,946,051 A | 2/1934 | Alden |
| 3,874,251 A * | 4/1975 | Lapitsky et al. ............ 475/230 |
| 4,304,317 A | 12/1981 | Vanzant et al. |
| 5,098,355 A | 3/1992 | Long |
| 5,507,702 A * | 4/1996 | Joachim et al. ............. 475/184 |
| 5,980,416 A | 11/1999 | Gafvert |
| 6,210,299 B1 * | 4/2001 | Yoshioka .................... 475/230 |

FOREIGN PATENT DOCUMENTS

JP          08145150 A * 6/1996 .......... F16H/48/08

* cited by examiner

Primary Examiner—Charles A Marmor
Assistant Examiner—Dennis Abdelnour
(74) Attorney, Agent, or Firm—Liniak, Berenato & White

(57) ABSTRACT

A compact differential assembly includes a differential case defining a cavity, a set of pinion mate gears rotatably mounted within the cavity in a free-floating manner, and a pair of opposite side gears drivingly engaging the differential pinion mate gears for allowing differential rotation between the side gears. Each of the side gears is integrally formed at an inward end of a corresponding axle shaft within an outside diameter thereof as a unitary single-piece part.

14 Claims, 5 Drawing Sheets

COMPACT DIFFERENTIAL ASSEMBLY

BACKGROUND OF THE INVENTION

1. Field of the Invention

The present invention relates to differential assemblies, and more particularly to a compact differential assembly for motor vehicles, having side gears integrally formed at an inboard end of a respective axle shaft within an outside diameter thereof as a unitary single-piece part.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Conventional differentials include a differential case defining a gear chamber, and disposed therein, a differential gear set including at least one input pinion gear, and a pair of output side gears non-rotatably coupled to corresponding axle shafts. Such a device essentially distributes the torque provided by the input shaft between the output shafts. This type of differentials is known in the art as an open differential, i.e. a differential where movements of its various internal components are not restricted in any significant fashion.

Normally, the differential assemblies comprise a differential case and a differential pinion shaft is disposed within the differential case for rotatably supporting a set of pinion mate gears. In turn, the pinion mate gears drivingly engage a pair of opposite side gears for allowing differential rotation therebetween. Typically, the side gears are splined to corresponding axle shafts.

The conventional differential assemblies are multipart and relatively voluminous aggregates, expensive in manufacturing and labor extensive in assembling.

Thus, there is a need for a differential assembly that is simple, compact and inexpensive to manufacture.

SUMMARY OF THE INVENTION

The present invention provides a novel arrangement of a compact differential assembly including a differential case, a set of free-floating pinion mate gears mounted therewithin, and a pair of opposite side gears integrally formed at inward ends of respective axle shafts within an outside diameter thereof as a unitary single-piece part, and drivingly engaging the differential pinion mate gears for allowing differential rotation therebetween.

In accordance with the first embodiment of the present invention, the differential assembly further includes a ring gear is fastened to the differential case.

Alternatively, in accordance with the second embodiment of the present invention, the differential case and the ring gear are integrally formed as a unitary single-piece part by any appropriate process well known in the art, such as casting, machining or powder metallurgy.

Therefore, the novel differential assembly in accordance with the present invention provides a simple, compact, inexpensive in manufacturing and easy to assemble differential assembly.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
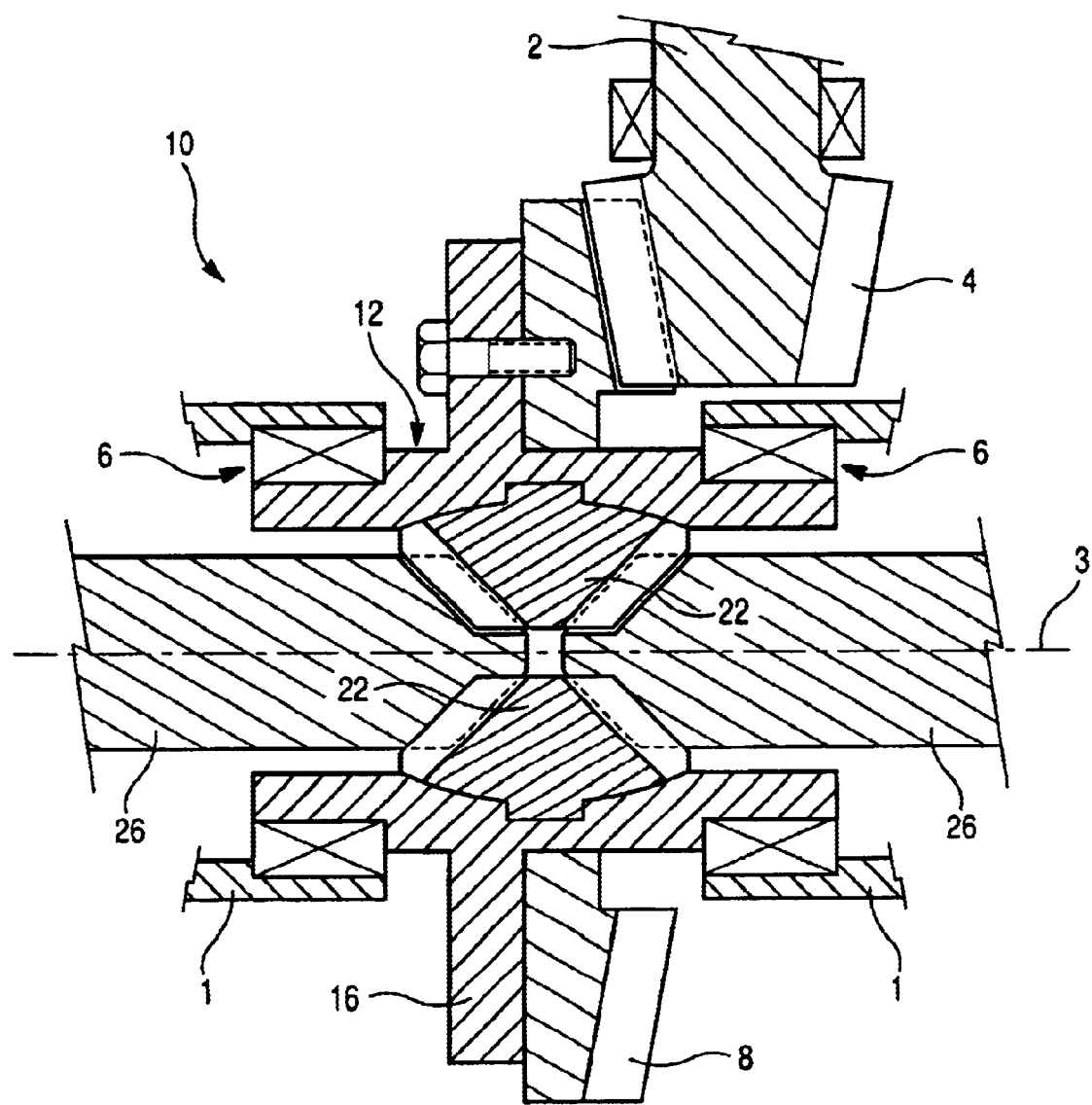
FIG. 1 is a sectional view of a differential assembly in accordance with the first embodiment of the present invention.
Figure 2:
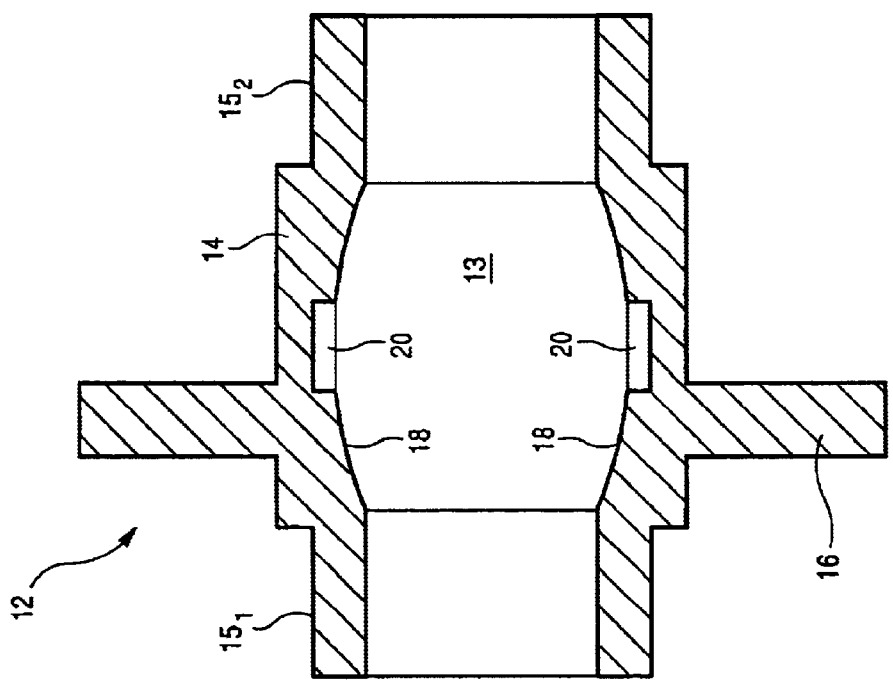
FIG. 2 is a cross-sectional view of a differential case in accordance with the first embodiment of the present invention.

FIG. 1 of the drawings illustrates the first exemplary embodiment of a differential assembly generally indicated at 10, in accordance with the present invention. Reference numeral 12 defines a differential case rotatably supported in a differential housing 1 for rotation about a central axis of rotation 3. The differential case 12, illustrated in detail in FIG. 2, includes a radially extending substantially annular hollow body 14, and a pair of cylindrical journal portions 15₁ and 15₂ coaxially oppositely extending therefrom. The journal portions 15₁ and 15₂ of the annular body 14 provide a surface, on which anti-friction bearings 6 are located to rotatably support the differential assembly 10 for rotation about the central axis 3 within the differential housing 1. Furthermore, the differential case 12 defines a cavity 13 therewithin coaxial to the central axis of rotation 3. A ring gear 8 is rigidly secured to a gear-mounting flange 16 formed on the differential case 12.

Driving torque is transmitted to the differential assembly 10 from a vehicular driveshaft (not shown) by means of a pinion shaft 2 provided with a drive pinion 4 in continuous meshing engagement with the ring gear 8.

The differential assembly 10 further comprises a set of pinion mate gear 22 rotatably supported in a free-floating manner inside the cavity 13 in the differential case 12. Preferably, the differential assembly 10 includes two pinion mate gears 22. However, any other appropriate number of the pinion mate gears, such as three, four, etc., is within the scope of the present invention.

Figure 3:
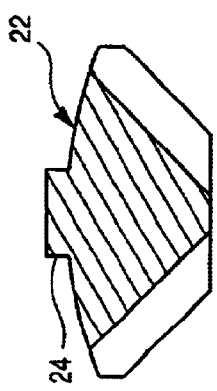
FIG. 3 is a sectional view of a pinion mate gear in accordance with the present invention.

Each of the pinion mate gears 22, illustrated in detail in FIG. 3, includes an integral shaft section 24 axially outwardly extending therefrom. In turn, the differential case 12 is provided with a plurality of complementary substantially cylindrical recesses 20 formed on an inner peripheral surface 18 of the cavity 13. As clearly illustrated in FIG. 1, the shaft sections 24 of the pinion mate gears 22 are adapted to be received in the corresponding recesses 20 in the inner peripheral surface 18 of the differential case 12. Thus, the pinion mate gears 22 are rotatably retained in the differential case 12 in a free-floating arrangement, and drivingly engage the differential case 12 for rotation therewith about the central axis 3.

Figure 4:
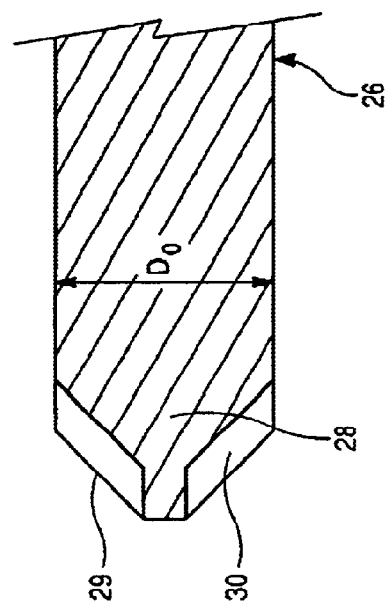
FIG. 4 is a sectional view of an axle shaft in accordance with the present invention.

The pinion mate gears 22 are in constant mesh with side gear teeth 30 integrally formed at inboard ends 28 of corresponding opposite axle shafts 26, as illustrated in detail in FIG. 4, and defining opposite coaxially disposed side gears of the differential assembly 10. The axle shafts 26 are extending from the differential case 12 coaxially to the central axis 3, and are adapted to rotate about the central axis 3. Preferably, the side gear 30 is formed on an inboard face 29 of each of the axle shafts 26 as a unitary single-piece part. As illustrated in FIG. 4, the side gear teeth 30 are, preferably, formed within an outside diameter $D_o$ of the inboard end 28 of the axle shaft 26.

Figure 5:
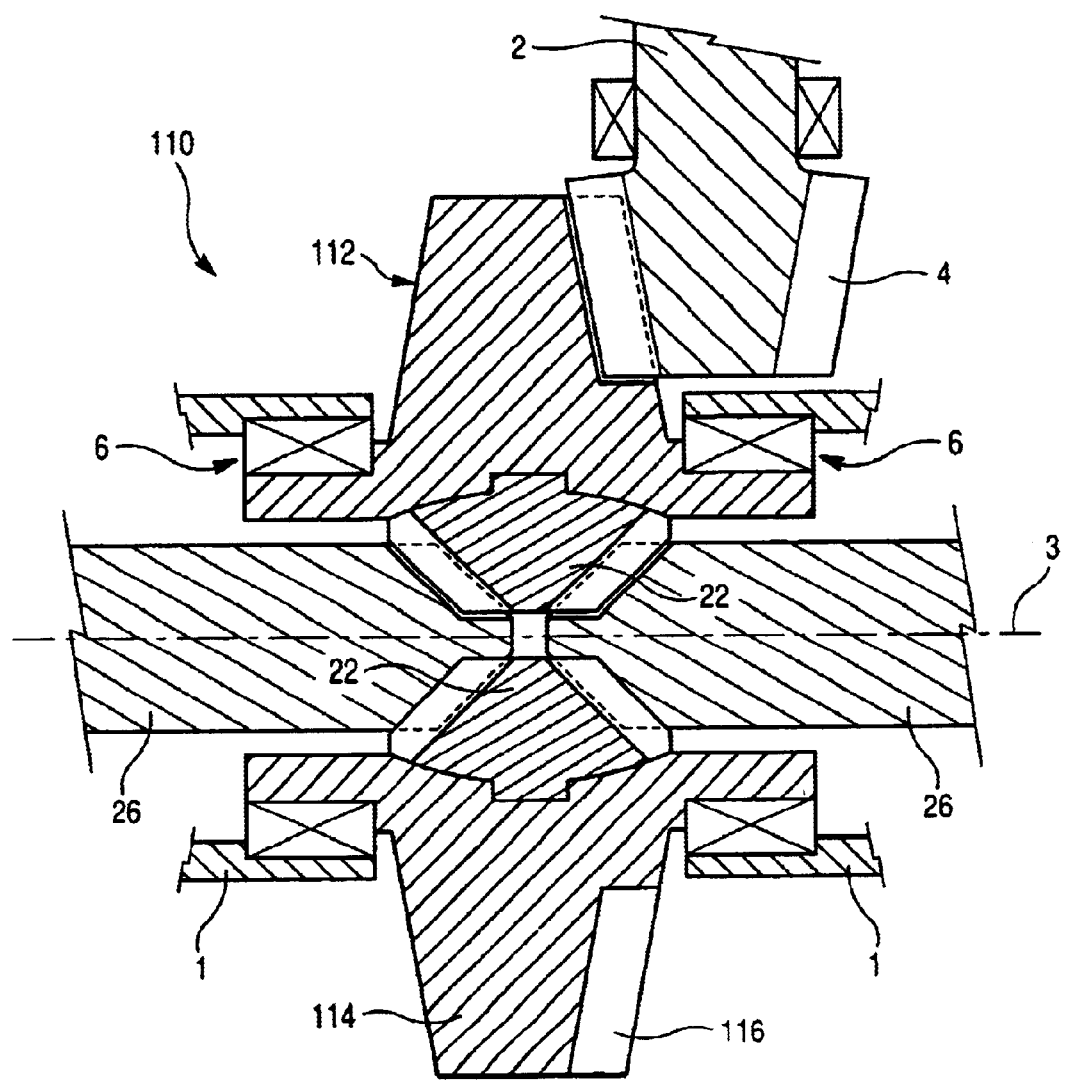
FIG. 5 is a sectional view of a differential assembly in accordance with the second embodiment of the present invention.
Figure 6:
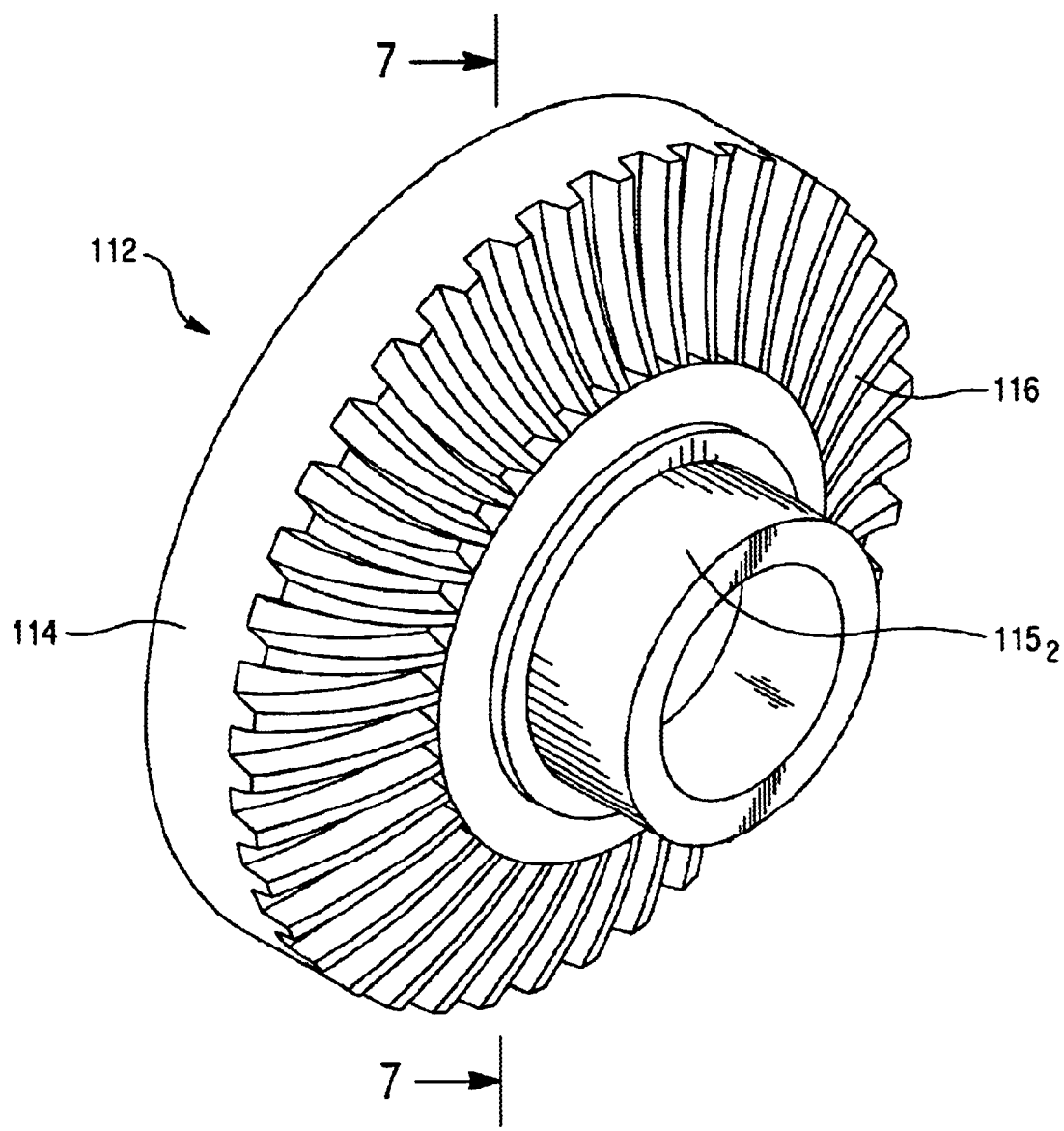
FIG. 6 is a perspective view of an integrated differential case and ring gear member in accordance with the second embodiment of the present invention.
Figure 7:
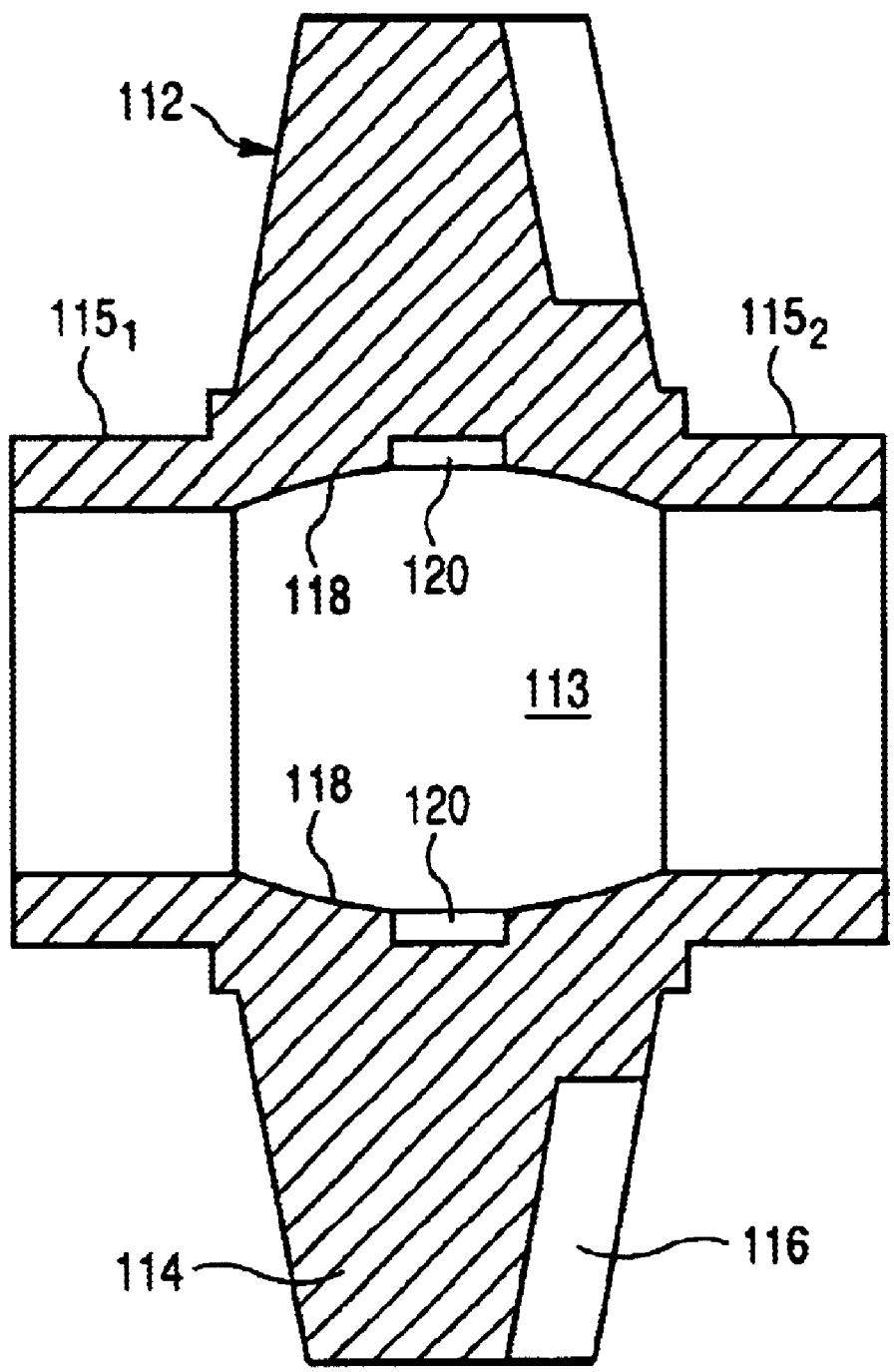
FIG. 7 is a cross-sectional view taken along line 7—7 of FIG. 6.

FIGS. 5–7 of the drawings illustrate a second exemplary embodiment of a differential assembly in accordance with the present invention, generally indicated at 110. Components, which are unchanged from, or function in the same way as in the exemplary embodiment depicted in FIGS. 1–4 are labeled with the same reference numerals. The differential assembly of FIG. 5 corresponds substantially to the differential assembly of FIG. 1, and only the differential case, which differs, will therefore be explained in detail below.

Reference numeral 112 defines an integrated single-piece differential case and ring gear member rotatably supported in a differential housing 1 for rotation about a central axis of rotation 3. The integrated differential case and ring gear member 112 is integrally formed as a unitary single-piece part by any appropriate process well known in the art, such as casting, machining or powder metallurgy.

The integrated differential case and ring gear member 112, illustrated in FIGS. 6 and 7, includes a radially extending substantially annular hollow body 114, and a pair of cylindrical journal portions 115₁ and 115₂ coaxially oppositely extending therefrom. The annular body 114 is provided with a plurality of ring gear teeth 116 integrally formed on an outer peripheral surface thereof. The journal portions 115₁ and 115₂ of the annular body 114 provide a surface, on which anti-friction bearings 6 are located to rotatably support the differential assembly 110 for rotation about the central axis 3 within the differential housing 1. Furthermore, the integrated differential case and ring gear member 112 defines a cavity 113 therewithin coaxial to the central axis of rotation 3.

Driving torque is transmitted to the differential assembly 110 from a vehicular driveshaft (not shown) through the ring gear teeth 116 of the differential case and ring gear member 112 by means of a pinion shaft 2 provided with a drive pinion 4 in continuous meshing engagement with the ring gear teeth 116.

The differential assembly 110 further comprises a set of pinion mate gear 22 rotatably supported in a free-floating manner inside the cavity 13 in the integrated differential case and ring gear member 12. Preferably, the differential assembly 10 includes two pinion mate gears 22. However, any other appropriate number of the pinion mate gears, such as three, four, etc., is within the scope of the present invention.

Each of the pinion mate gears 22, illustrated in detail in FIG. 3, includes a shaft section 24 axially outwardly extending therefrom. In turn, the integrated differential case and ring gear member 12 is provided with a plurality of complementary substantially cylindrical recesses 120 formed on an inner peripheral surface 118 of the cavity 13, as illustrated in FIG. 7. As clearly illustrated in FIG. 5, the shaft sections 24 of the pinion mate gears 22 are adapted to be received in the corresponding recesses 120 in the inner peripheral surface 18 of the differential case and ring gear member 12.

Thus, the pinion mate gears 22 are rotatably retained in the integrated differential case and ring gear member 12 in a free-floating arrangement, and drivingly engage the integrated differential case and ring gear member 12 for rotation therewith about the central axis 3.

The pinion mate gears 22 are in constant mesh with side gear teeth 30 integrally formed at inboard ends 28 of corresponding opposite axle shafts 26, as illustrated in detail in FIG. 4, and defining opposite coaxially disposed side gears of the differential assembly 110. The axle shafts 26 are extending from the differential case 112 coaxially to the central axis 3, and are adapted to rotate about the central axis 3. Preferably, the side gear 30 is formed on an inboard face 29 of each of the axle shafts 26 as a unitary single-piece part. As illustrated in FIG. 4, the side gear teeth 30 are, preferably, formed within an outside diameter $D_o$ of the inboard end 28 of the axle shaft 26.

Therefore, the compact differential assembly in accordance with the present invention represents a novel arrangement of the differential assembly that is simple, compact, inexpensive in manufacturing and easy to assemble.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A differential assembly comprising:

a differential case rotatable about a central axis;

a set of pinion mate gears rotatably supported by said differential case; and a pair of opposite side gears drivingly engaging said differential pinion mate gears for establishing driving connection between said differential case and said side gears and allowing differential rotation between said side gears, each of said side gears is integrally formed at an inboard end of a respective axle shaft within an outside diameter of a portion of said respective axle shaft extending outside said differential case as a unitary single-piece part, wherein each of said pinion mate gears has an integral shaft section drivingly engaging said differential case in a free-floating manner.

2. The differential assembly as defined in claim 1, wherein an inner peripheral surface of said differential case is provided with a plurality of substantially cylindrical recesses receiving said shaft sections of said pinion mate gears.

3. The differential assembly as defined in claim 1, wherein said differential case is formed integrally with a ring gear as a unitary single-piece part.

4. A differential assembly comprising:
   a differential case rotatable about a central axis, said differential case is adapted to be driven about said axis by an external driving force;
   a set of pinion mate gears rotatably supported inside said differential case, each of said pinion mate gears having an integral shaft section drivingly engaging said differential case in a free-floating manner; and
   a pair of opposite side gears drivingly engaging said differential pinion mate gears for establishing driving connection between said differential case and said side gears and allowing differential rotation between said side gears, each of said side gears is disposed at an inboard end of a respective axle shaft.

5. The differential assembly as defined in claim 4, wherein each of said side gears is integrally formed at said inboard end of said axle shaft as a unitary single-piece part.

6. The differential assembly as defined in claim 5, wherein each of said side gears is integrally formed at said inboard end of said axle shaft within an outside diameter of said shaft.

7. The differential assembly as defined in claim 4, wherein said differential case is formed integrally with a ring gear as a unitary single-piece part.

8. A differential assembly comprising:
   an integrated single-piece differential case and ring gear member integrally formed as a hollow unitary single-piece part rotatable about a central axis, said integrated differential case and ring gear member defines a cavity therewithin, said integrated differential case and ring gear member is adapted to be driven about said axis by an external driving force;
   a set of pinion mate gears rotatably supported by said integrated differential case and ring gear member inside said cavity, each of said pinion mate gears is supported by said integrated differential case and ring gear member in a free-floating manner; and
   a pair of opposite side gears drivingly engaging said differential pinion mate gears for establishing driving connection between said integrated single-piece differential case and ring gear member and said side gears and allowing differential rotation between said side gears, each of said side gears is disposed at an inboard end of a respective axle shaft,
   wherein each of said pinion mate gears having an integral shaft section drivingly engaging said integrated differential case and ring gear member in a free-floating manner.

9. The differential assembly as defined in claim 8, wherein an inner peripheral surface of said integrated differential case and ring gear member is provided with a plurality of substantially cylindrical recesses receiving said integral shaft sections of said pinion mate gears.

10. The differential assembly as defined in claim 8, wherein each of said side gears is integrally formed at said inboard end of said axle shaft as a unitary single-piece part.

11. The differential assembly as defined in claim 10, wherein each of said side gears is integrally formed at said inboard end of said axle shaft within an outside diameter of a portion of said respective axle shaft extending outside said differential case and ring gear member.

12. The differential assembly as defined in claim 8, wherein said integrated differential case and ring gear member includes coaxially aligned journal portions disposed an opposite sides of said integrated differential case and ring gear member.

13. A differential assembly comprising:
   a rotatable differential case having an inner peripheral surface provided with a plurality of substantially cylindrical recesses;
   a set of pinion mate gears rotatably supported inside said differential case, each of said pinion mate gears having an integral shaft section drivingly engaging corresponding one of said plurality of said cylindrical recesses in said inner peripheral surface of said differential case in a free-floating manner; and
   a pair of opposite side gears drivingly engaging said differential pinion mate gears for establishing driving connection between said differential case and said side gears and allowing differential rotation between said side gears, each of said side gears is integrally formed at an inboard end of a respective axle shaft within an outside diameter of a portion of said respective axle shaft extending outside said differential case as a unitary single-piece part.

14. A differential assembly comprising:
   an integrated single-piece differential case and ring gear member integrally formed as a unitary single-piece part, said integrated differential case and ring gear member includes coaxially aligned journal portions disposed on opposite sides thereof, said integrated differential case and ring gear member defines a cavity therewithin having an inner peripheral surface provided with a plurality of substantially cylindrical recesses;
   a set of pinion mate gears rotatably supported by said integrated differential case and ring gear member inside said cavity, each of said pinion mate gears having an integral shaft section drivingly engaging corresponding one of said plurality of said cylindrical recesses in said inner peripheral surface of said cavity in said integrated differential case and ring gear member in a free-floating manner; and
   a pair of opposite axle shafts axially outwardly extending from said integrated differential case and ring gear member, said pair of opposite shafts including a pair of opposite side gears each formed at an inboard end of a corresponding one of said axle shafts within an outside diameter of a portion of said respective axle shaft extending outside said integrated single-piece differential case and ring gear member as a unitary single-piece part, wherein said pair of opposite side gears is drivingly engaging said differential pinion mate gears for establishing driving connection between said integrated single-piece differential case and ring gear member and said side gears and allowing differential rotation between said side gears.

* * * * *